ORGANOSILICON COMPOUNDS AND PROCESSES
FOR PRODUCING THE SAME

Donald L. Bailey, Snyder, and Victor B. Jex, Kenmore,
N.Y., assignors to Union Carbide Corporation, a corporation of New York
No Drawing. Filed Oct. 12, 1956, Ser. No. 615,492
Int. Cl. C08g 31/16; C07f 7/18
U.S. Cl. 260—46.5                                     11 Claims This invention relates in general to the synthesis of organosilicon compounds. More particularly, the invention contemplates the provision of new organosilane and organosiloxane derivatives containing, among other possible functional groups, a carboxy or carboalkoxy functional group which is linked to the silicon atom or atoms through an aliphatic hydrocarbon substituent in a position removed from the silicon nucleus by at least two carbon atoms of the aliphatic linkage, i.e., beta-substituted or further along a silicon-bonded polymethylene chain. The invention further contemplates the provision of unique processes for producing compounds of the general class described as well as useful derivatives of such compounds.

Heretofore, organosilicon compounds containing silicon-substituted carboxylated radicals have been produced by reacting, in the presence of a peroxide catalyst, unsaturated aliphatic or cyclic monoesters and diesters with halogen-hydrocarbon-, or halogenated hydrocarbon-substituted silanes containing at least one silanic hydrogen bond, to provide a carboxylated silane which is then hydrolyzed to produce a coersponding siloxane. While the foregoing technique has been applied largely in connection with the cyclic esters, it has been postulated by at least some investigators that the process is unsatisfactory when applied to aliphatic and cyclic unsaturated esters in which the unsaturated linkage is so positioned that a functional carbonyl group will be positioned less than three carbon atoms from the silicon nucleus following the ester-silane reaction, as would be the case, for example, when esters of acrylic acid are employed as starting materials. That is to say, it would appear from available literature reports that the process is inherently limited to the production of silanes and siloxanes in which the carboxy or carboalkoxy substituents are positioned no closer to the silicon atom than the gamma carbon atom of the silicon-bonded connecting chain or ring structure. Apart from the foregoing reported process limitations, the silane end-products of the ester-silane reaction as practiced heretofore in the production of organosilicon compounds containing carboxylated radicals are restricted to residual silicon functional groups consisting of hydrogen or halogen, or non-hydrolyzable residues such as methyl and phenyl substituents.

The present invention is based, in part, upon our discovery that silicon compounds containing a carboalkoxy group attached to the silicon atom through a polymethylene linkage may be produced by the acid-catalyzed alcoholysis of cyanoalkyl silicon compounds, whereby the cyano group (—CN) of the cyanoalkyl substituent is converted to the desired carboalkoxy substituent, as represented in general by the following equation:

(I)   NC(CH$_2$)$_a$Si≡ +ROH+HCl→
      ROOC(CH$_2$)$_a$Si≡ +NH$_4$Cl+RCl wherein R represents a monovalent hydrocarbon radical, including both alkyl and aryl radicals, and $a$ may be any number greater than one. Whereas any strong mineral acid may be employed as catalyst in the alcoholysis reactions of the invention, we perfer to employ hydrochloric acid as depicted within the foregoing equation because of its ease of removal as compared, for example, with sulfuric acid.

The basic reaction of the invention as illustrated above is equally applicable to the cyanoalkylsilanes, cyanoalkylalkoxysilanes and cyanoalkylsiloxanes. Thus, suitable cynaoalkyl monomeric and polymeric starting materials for use in the process of the invention may be represented in general by the following formulae:

(A)         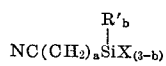

and (B)         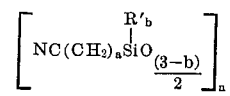

wherein R' represents any monovalent hydrocarbon radical, including both alkyl and aryl radicals; X represents halogen or alkoxy; $a$ is any number greater than one; $b$ in Formula A has a value from 0 to 3 inclusive, and in Formula B a value from 0 to 2 inclusive; and $n$ in Formula B may be any whole number greater than one. Cyanoalkyl compounds of the general class defined above and processes for their production have been described and claimed in copending U.S. application Ser. No. 555,201, filed jointly by Victor B. Jex and J. E. McMahon on Dec. 23, 1955, now U.S. Patent 3,257,440 and Ser. No. 555,203, filed jointly by Victor B. Jex and R. Y. Mixer, also on Dec. 23, 1955.

The process of the invention is particularly useful in the preparation of carboalkoxy-substituted compounds, and is unique in its application to the production of the carboalkoxy - alkyldialkylalkoxy-, carboalkoxyalkylalkyldialkoxy- and carboalkoxyalkyltrialkoxysilane monomers as represented in general by the following formula:

(C)         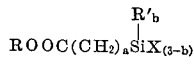

wherein R and R' represent monovalent hydrocarbon radicals; X represents alkoxy; $a$ is any number greater than one; and $b$ has a value from 0 to 2 inclusive.

The above-indicated compounds are prepared by esterification of the cyanoalkylchlorosilanes and subsequent acid-catalyzed alcoholysis of the cyano group as per Equation I above. The process is most convenient since the ester is formed initially and the hydrogen chloride evolved in its formation may be utilized in the subsequent alcoholysis reaction. In general, the combined reaction is effected by placing the particular cyanoalkylchlorosilane starting material within a suitable reaction vessel fitted with a stirrer, thermometer, reflux condenser and dropping funnel. Absolute alcohol is then added to the reaction vessel with stirring and the hydrogen chloride evalved by the reaction is passed from the vessel. When one, two or three equivalents of alcohol have been added, depending upon whether the starting material is a mono-, di-, or trichlorosilane, approximately a three molar excess of alcohol over that required for alcoholysis of the nitrile group is added, and the solution is heated to the reflux temperature. The solution is refluxed for several hours during which time ammonium chloride is formed. The mixture is then filtered, and the excess alcohol removed by a suitable vacuum evaporation technique. The resulting carboalkoxyalkylalkoxysilane is then distilled to yield the pure compound.

We have found that while theoretical quanitities of alcohol and hydrogen chloride can be used in the process of the invention, it is generally best to employ a two or three molar excess of alcohol, and to maintain the solution substantialy saturated with hydrogen chloride during the alcoholysis reaction. The reaction is conveniently conducted at the refluxing temperature of the alcohol employed, usually at temperatures within the range 50–110° C. for the more common aliphatic alcohols such as methanol, ethanol, propanol, butanol, etc., but higher temperatures can be employed. Significantly, we found that substantially increased yields can be obtained by conducting the alcoholysis reaction under pressure, and such a procedure is advisable for large scale commercial operations.

The monomeric alkoxy-substituted silanes as represented by Formula C above are readily hydrolyzed and condensed to the siloxanes, and, in the reaction, the carboalkoxy group may be preserved or hydrolyzed to a carboxy group. Thus, for example, the following equation represents a typical reaction for the production of a carboxy-substituted polysiloxane by hydrolysis of a silicon trifunctional carboalkoxy silane in the presence of a strong acid (HCl), wherein R and $a$ have the meanings assigned above and $n$ is any number greater than one:

(II)

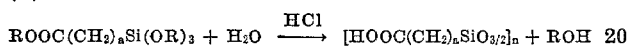

In the absence of mineral acid, the silane monomers may be hydrolyled to produce cyclic siloxanes which retain the carboalkoxy organo functional group, as represented in general by the following equation illustrating the hydrolysis of a silicon difuctional carboalkoxy silane, wherein R, R' and $a$ have the meanings assigned above and $n$ is any number greater than two:

(III)

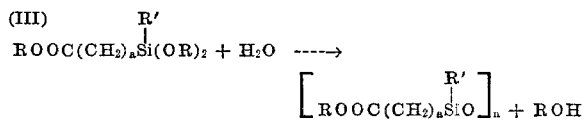

Alternatively, we may effect the direct acid-catalyzed alcoholysis of a cyanoalkyl siloxane (Formula B above) with conversion of the cyano group to produce a corresponding carboalkoxy siloxane derivative of linear or cyclic structure depending on the starting material employed, and represented by the following equation, wherein R, R' $a$ and $n$ have the meanings previously assigned above:

(IV)

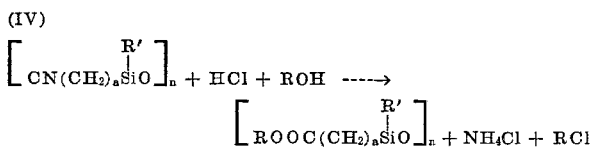

The carboalkoxy silicone products of the invention may be subjected, also, to transesterification to produce modified carbofunctional silicone esters. Thus, the carboalkoxyalkylalkoxysilanes and carboalkoxalkyl siloxanes obtained by the foregoing basic reactions may be transesterified in the presence of an acid catalyst to produce silicone esters of the types represented by the following formulae:

(D)

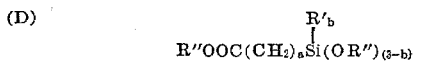

or (E)

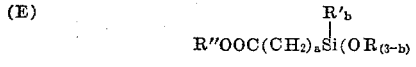

or (F)

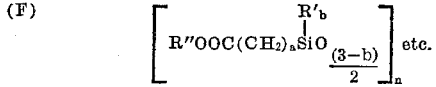

wherein R, R', $a$, $b$ and $n$ have the meanings previously assigned above, and R" represents a monovalent hydrocarbon radical.

The alcohols used in the transesterification reaction may be of the aliphatic primary, secondary or tertiary alcohols, or hydroxy-endblocked polypropylene or polyethylene oxide polymers, or, aromatic hydroxy compounds such as phenol may be employed. When carrying out the transesterification reactions, we prefer to employ anhydrous conditions inasmuch as the esterification is a reversible reaction. In the case of the carboalkoxyalkylalkoxy silanes anhydrous operations are necessary in order to prevent the formation of Si—O—Si bonds by hydrolysis. The ratio of the reactants is not critical in the reaction, and, in fact, we have found that even with molar ratios of less than one alcohol group per alkoxy group, some transesterification takes place although the end-products under such conditions are usually mixed compounds. We have further found it to be possible, by use of controlled amounts of alcohol, to transesterify only the carboalkoxy group while retaining any siliconalkoxy bonds unchanged, as represented by the compounds of Formula E above. When complete transesterification is sought, it is desirable to use one mole of the alcoholic reagent for each alkoxy group in the molecule, and, if a relatively volatile alcohol is used, to employ a slight excess as in the case of the basic alcoholysis reaction described hereinbefore.

Any strong acid may be used to catalyze the transesterification reaction also, but we prefer to employ acids such as trifluoroacetic, perfluoroglutaric or any perfluoro organic acid or hydrogen chloride, since such acids are readily removable from the reaction system. The reaction may be effected at temperatures within the range 60–250° C. While we have employed temperatures within the range 60–200° C. for the reaction when a catalyst such as trifluoroacetic acid was used, temperatures within the range 200–250° C. have been employed with satisfactory results. While the transesterification reaction may be effected under pressure also, this practice merely serves to raise the reaction temperature. In actual practice, we prefer to operate at atmospheric pressure so that the more volatile alcohol may be removed, thereby driving the reaction to completion. Furthermore, while the reaction may be effected in solvents such as benzene, toluene, xylene, etc., with the advantage of raising and permitting control of the temperature at reflux and thereby facilitating the removal of the more volatile alcohol, we have found that the reaction may be controlled adequately in the absence of any solvent and prefer to operate in this manner.

In general, the carboalkoxyalkylalkoxysilane monomers of the invention will undergo all of the usual reactions of organic esters and alkoxysilanes to yield a variety of silicone products. The silanes are generally water-white liquids which are thermally stable on distillation at atmospheric pressure; no loss occurring due to cleavage or polymer formation. They possess long shelf-life provided they are stored in a closed system, and are relatively light stable, in that, no darkening or polymer formation can be detected when the materials are stored in covered containers. The alkoxy groups attached to the silicon nucleus hydrolyze in the presence of moisture in a manner similar to conventional alkoxysilane derivatives. On treatment with excess water the compounds yield hydrolyzates by reaction of their siilcon-bonded alkoxy groups which vary in composition from viscous, colorless oils to aqueous-alcoholic solutions of the corresponding polysiloxanes. These hydrolyzates may be concentrated to yield resins. The addition of small amounts of water to the compounds yield intermediate liquid hydrolysis products of varying compositions. The hydrolysis reactions can be controlled to effect complete or partial hydrolysis such that the resulting compounds will contain some residual alkoxy groups.

The silane ester monomers can be cohydrolyzed with other alkoxy silanes for the production of silicone oils, fluids and resins containing residual alkoxy groups, as represented in general by the following equations illustrating, on a unit basis, the cohydrolysis of a silicon-difunctional and silicon-trifunctional silane of the invention with other alkoxysilanes:

(V)

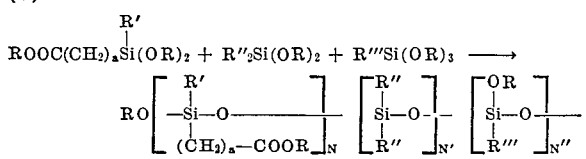

and (VI)

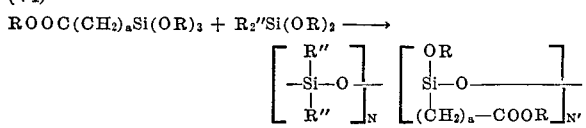

where R, R', R'' and $a$ have the meaning assigned above, and R''' represents a monovalent hydrocarbon radical.

The siloxanes of this invention include those represented by the formula:

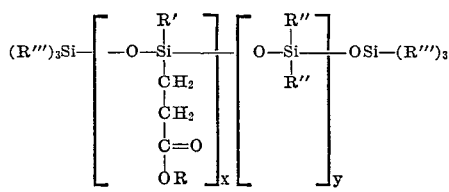

wherein R is a member selected from the group consisting of hydrogen and monovalent hydrocarbon radicals; R' and R'' are members selected from the group consisting of monovalent hydrocarbon radicals; R''' is a member selected from the group consisting of alkoxy and monovalent hydrocarbon radicals; and $x$ and $y$ are whole numbers.

The polysiloxanes prepared from the silane monomers of the invention are extremely useful in the production of a variety of carboxy- and carboalkoxysiloxy-modified silicone and organic products. They may be copolymerized with other siloxanes of the general unit formulation:

(G) $\qquad R''_b SiO_{\frac{4-b}{2}}$ wherein $b$ has a value from 1 to 3 inclusive, and R'' represents any monovalent hydrocarbon radical. The copolymerization can be effected in conventional manner as, for example, by cohydrolysis of the corresponding hydrolyzable silane as illustrated above (Equations V and VI), or by catalytic copolymerization of the siloxanes, per se, in the presence of a siloxane bond-rearranging catalyst. A typical equilibration of the general class described is that represented by the production of carboalkoxypolymethylenealkylsiloxy-modified silicone oils from the hydrolyzates of carboalkoxypolymethylenealkyldialkoxysilanes, or the corresponding cyclopolysiloxanes, with other silicone cyclics and a suitable endblocker, in the presence of acid catalysts as, for example, the equilibration of gamma-carbethoxypropylmethylsiloxane cyclic tetramer, dodecamethylpentasiloxane, dimethylsiloxane cyclic tetramer and sulfuric acid, to yield the carbethoxy-modified dimethylsilicone oil represented by the equation:

Of course, depending upon the ratio of reactants employed, one may obtain a variety of oils of varying molecular weights and percentages of carboalkoxy substituents, and oils containing phenyl, ehyl, vinyl and other groups may be prepared in a similar manner. Alternatively, in the absence of the end-blocking polymer one may prepare a variety of silicone gum stock polymers.

The hydrolyzates of the carboalkoxyalkylalkoxysilane monomers of the invention may be readily converted into the corresponding acid salts by saponification with base as represented in general by the following equation illustrating the aqueous alkali saponification of a typical polysiloxane of the invention:

(VIII)

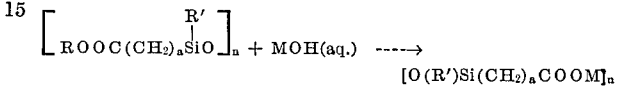

The acid salts thus produced are water soluble materials. The free acids are readily obtainable by neutralization of the salts with a strong acid, and the silicone acids prepared in this manner can be reacted with thionyl chloride, for example, to produce the corresponding acid chlorides which undergo reactions typical of organic acid chlorides.

Apart from the transesterification and saponification reactions illustrated above, the carboalkoxy groups of the silane monomers may be reacted with primary aliphatic or aromatic mono- or diamines, such as n-butylamine, propylene diamine and p-aminobenzoic acid, to yield amide derivatives, as represented in general by the following equation illustrating the reaction of a typical silane of the invention with a primary amine:

(IX)

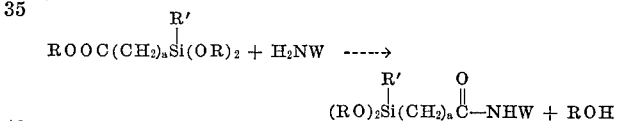

The novel monomeric and polymeric compounds produced by the processes of the invention have been employed in the production of a variety of carboxy- and carboalkoxyalkylsiloxy - modified silicones and organic derivatives of the types represented by the foregoing general equations, including among others, for example, silicone oils which are easily emulsified, oxidation resistant silicone-alkyd resins, ultraviolet absorbing aromatic amides, silicone elastomers, and esters of polyalkene glycols which are found to be good lubricants. Certain of these products are included within the examples which are presented hereinafter for purposes of illustrating the utility of the end-products of the present invention, but reference should be had, also, to our copending aplications Ser. Nos. 615,468, now U.S. Patent 2,957,899 and 615,499, filed of even date, wherein we have described and claimed other silicone products as well as certain of the linear and cyclic siloxanes which can be produced by application of the principles and techniques of the present invention.

The chemistry of certain of the basic processes of the invention as described hereinbefore, as well as the end-products derived thereby, are summarized graphically within the following reaction chart wherein silicon tri- (VII)

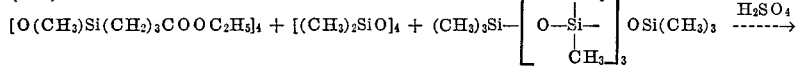

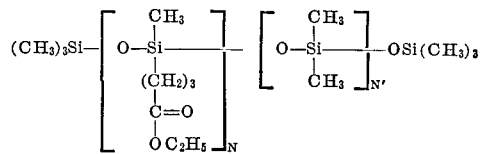

functional compounds have been depicted for purposes of illustration on a unit formula basis:

REACTION CHART

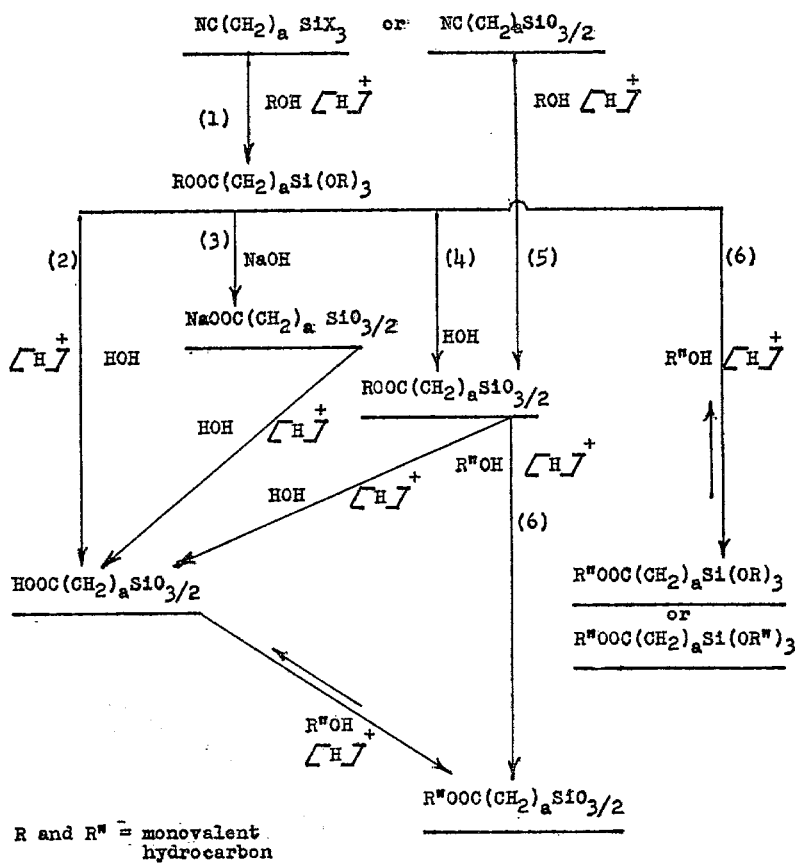

R and R″ = monovalent hydrocarbon

X = halogen or alkoxy a = 2 or more

It is believed that the invention may be best understood by reference to the following specific examples which describe the preparation of typical compounds in accordance with the foregoing principles and procedures.

PREPARATION OF CARBOALKOXYPOLYMETHYLENEALKOXYSILANES BY ACID ALCOHOLYSIS OF CYANOPOLYMETHYLENECHLOROSILANES

Example I.—Preparation of beta-carbethoxyethyltriethoxysilane and beta-carbethoxyethylmethyldiethoxysilane by reaction of ethanol with beta-cyanoethyltrichlorosilane and beta-cyanoethylmethyldichlorosilane

CHART REACTION I (A) Beta-carbethoxyethyltriethoxysilane.—A five hundred (500) milliliter flask, fitted with a dropping funnel, magnetic stirrer and a reflux condenser, was charged with 168.6 grams (0.894 mole) of beta-cyanoethyltrichlorosilane. During a two-hour period, 164.2 grams (3.576 moles) of anhydrous ethanol were added to the flask through the dropping funnel. Hydrogen chloride gas was evolved, and nitrogen gas was used to purge the excess HCl from the reaction mixture. Additional absolute ethanol, in amount 115 milliliters (1.97 moles), was added, and the mixture was heated at reflux for 16 hours. The excess unreacted ethanol was removed by stripping at reduced pressure. The alcohol-free reaction products were dissolved in diethyl ether and filtered to separate the ammonium chloride precipitate. The filtrate was then vacuum-stripped to remove the diethyl ether and the residual product distilled as follows:

150 grams of distillate (Cut A) was obtained at 84° C. to 90° C. at 2.2 mm. Hg pressure; 6 grams additional (Cut B) from 90° C. to 170° C. at 22 mm. Hg pressure; and 20 grams (Cut C) at 172° C. to 175° C. at 1.9 mm. Hg pressure, leaving a twenty (20) gram residue.

Cuts A and B totaling 156 grams, were combined and carefully fractionated at 2.5–2.6 mm. Hg pressure, yielding; 75 grams at 85–86° C. (Cut 1); 22 grams at 86–94.3° C. (Cut 2); 6 grams at 94.3–95° C. (Cut 3); and 33 grams at 95–95.1° C. (Cut 4). The higher boilers were not distilled.

Cut 4 was selected as the best sample of the desired product, beta-carbethoxyethyltriethoxysilane. Ultimate analysis as compared with the theoretical is presented below:

|  | $EtOOCCH_2CH_2Si(OEt)_3$ (percent by weight) | |
| --- | --- | --- |
|  | Theoretical | Found |
| Carbon | 50.0 | 50.3 |
| Hydrogen | 9.15 | 9.8 |
| Silicon | 10.6 | 10.4 |

The sample was also subjected to infrared spectral analysis which confirmed its structural composition. The refractice index ($n_D^{25°\,C.}$) was 1.4125 and the density ($d^{25°\,C.}$) was 0.982. The molar refraction based on density and refractive index is 67.06 compared with 66.74 from a summation of bond values.

(B) Beta-carbethoxyethyltriethoxysilane.—In another experiment, 151 grams of dry ethanol were added slowly to 123 grams of beta-cyanoethyltrichlorosilane. The molar ratio of alcohol to silane was 5 to 1. The reactants became hot during the addition of alcohol, and hydrogen cloride was evolved. After all the alcohol had been added, and the hydrogen chloride evolution subsided, the mixture was refluxed for one and one-half (1½) hours. During refluxing, ammonium chloride precipitated. This was filtered, dried and weighed, and the amount collected (26.7 grams) indicated that alcoholysis of the nitrile group was 94.2% complete.

The filtrate was fractionated and the major portion, boiling at 124–125° C. and 10 mm. Hg pressure, had a refractive index at 25° C. of 1.4120 which is close to that of the product produced in Example 1–A.

(C) Beta-carbethoxyethylmethyldiethoxysilane.—In an analogous manner, alcoholysis of beta-cyanoethylmethyldichlorosilane with ethanol yielded the pure product $C_2H_5OOC(CH_2)_2SiMe(OEt)_2$. Ultimate analysis as compared with the theoretical for the compound is presented below:

| | $C_{10}H_{22}SiO_4$ Percent by weight | |
|---|---|---|
| | Theoretical | Found |
| Carbon | 51.2 | 50.9 |
| Hydrogen | 9.5 | 9.3 |
| Silicon | 12.0 | 12.4 |
| OEt (total) | 57.7 | 57.3 |

B.P. 95.0–95.5° C./5.0 mm. $n_D^{25}=1.4121$.

Example II.—Preparation of gamma-carbethoxyproplytriethoxysilane by reaction of ethanol with gamma-cyanopropyltrichlorosilane

CHART REACTION 1

Gamma-cyanopropyltrichlorosilane, in amount 160 grams (0.79 mole) was placed in a two-liter three-necked flask fitted with a dropping funnel stirrer and reflux condenser. Absolute ethanol in amount 165 grams was then added slowly with stirring while allowing the hydrogen chloride to escape. After the addition was complete, the solution was stirred and refluxed for eight (8) hours. The ammonium chloride which precipitated was removed by filtration, and the filtrate was refluxed for an additional eight (8) hours. The solution was again filtered to remove the ammonium chloride and the ethanol was removed by a vacuum evaporation. The residue was distilled through a 15-inch Vigreux column under reduced pressure and 93 grams of material were collected. This was redistilled and a center fraction taken for analysis. It distilled between 86 and 89° C. at 0.5 mm. Hg and had a refractive index of 1.4152 at 25° C. The analytical data, for an average of two are set forth below:

| | Found | Theoretical |
|---|---|---|
| Carbon (percent by weight) | 50.1 | 51.6 |
| Hydrogen (percent by weight) | 9.0 | 9.7 |
| Silicon (percent by weight) | 10.5 | 10.1 |
| Nitrogen (percent by weight) | 0.7 | |
| Ethoxy Content (percent by weight) | 57.9 | 64.5 |
| Saponification No. (mg./KOH, gm.) | 227 | 202 |

Example III.—Preparation of gamma-carbethoxypropylmethyldiethoxysilane by reaction of ethanol with gamma-cyanopropylmethyldichlorosilane

CHART REACTION 1

Absolute ethanol in amount 81.5 grams and gamma-cyanopropylmethylidichlorosilane, in amount 80 grams, were carefully mixed and then refluxed for three hours. During this time a white precipitate ($NH_4Cl$) formed. The precipitate, weighing 16.1 grams, was filtered off and the filtrate was stored over anhydrous sodium sulfate. The alcoholic solution was filtered from the anhydrous sodium sulfate and the alcohol removed by vacuum evaporation. The liquid residue was then fractionated. A substantial fraction (B.P. 127–129° C. at 8 mm. Hg), was collected. The fraction was shown to contain no nitrogen by a sodium fusion and was identified as the desired gamma-carbethoxypropylmethylidethoxysilane $(n_D^{25°\,C.}=1.4208)$ A sample of the compound was analyzed for carbon, hydrogen and silicon and the following data were obtained:

| | Percent by weight | |
|---|---|---|
| | Found | Theoretical |
| Carbon | 52.5 | 53.3 |
| Hydrogen | 9.9 | 9.65 |
| Silicon | 11.7 | 11.8 |

The white precipitate ($NH_4Cl$) was dissolved in aqueous sodium hydroxide solution and ammonia gas was evolved. The 16.1 grams of $NH_4Cl$ indicated an eighty-four percent (84%) conversion of nitrile to carbethoxy groups.

PREPARATION OF A CARBOXYPOLYMETHYLENEPOLYSILOXANE BY ACID HYDROLYSIS OF A CARBOALKOXYPOLYMETHYLENEALKOXYSILANE

Example IV.—Preparation of beta-carboxyethylpolysiloxane by hydrolysis of beta-carbethoxyethyltriethoxysilane in the presence of hydrochloric acid

CHART REACTION 2

Beta-carbethoxyethyltriethoxysilane from Example I–B, in amount 88.9 grams, and 200 milliliters of water were mixed in a one-liter round-bottomed flask. The mixture was refluxed for one hour, but no reaction seemed to occur. A small amount (30 milliliters) of 3 N hydrochloric acid was aded to the reaction mixture and refluxing was continued for two hours. The solution became cloudy. It was fractionated to remove the alcohol. On cooling the material gelled. The gel was filtered, the solid filter cake dried under vacuum, and the filtrate evaporated under vacuum. The solid products were combined and ground to a fine white powder and the powdery solid polymer was then dried at 100° C. for six hours in a vacuum oven to remove the last traces of water and HCl. The yield was 39.5 grams or 93.8 percent of theoretical. The polymer gave the following analysis:

| | Percent by weight | |
|---|---|---|
| | Found | Theoretical |
| Carbon | 28.3 | 28.8 |
| Silicon | 21.3 | 22.4 |

The polymer was water-soluble, and its equivalent weight could be determined by titration with base. It was found to be 125 as compared to the theoretical of 127.4. The polymer was also soluble in methanol, and dimethyl formamide but was insoluble in carbon tetrachloride, diethylether, acetone, glacial acetic acid and cyclohexane.

PREPARATION OF CARBOALKOXYPOLYMETHYLENEPOLYSILOXANE BY NEUTRAL HYDROLYSIS OF CARBOALKOXYPOLYMETHYLENEALKOXYSILANES

Example V.—Preparation of gamma-carbethoxypropylmethylcyclosiloxane polymers by neutral hydrolysis of gamma-carbethoxypropylmethyldiethoxysilane

CHART REACTION 4

Gamma - carbethoxypropylmethyldiethoxysilane from Example III, in amount of 33 grams, was dissolved in 100 cubic centimeters of diethylether in an eight-ounce bottle. Distilled water was then added in an excess; the mixture was shaken vigorously, and left standing for seventy-two (72) hours. The ether layer was separated and dried by an azeotropic distillation using benzene as the solvent. The residue, amounting to 21.3 grams, was then stripped under vacuum and distilled through a "Hickman" molecular still at 0.3–0.4 Hg, with 12.4 grams of volatile product being recovered in three fractions.

Fraction I was collected from 200–230° C. and had a refractive index at 25° C. of 1.4465 indicating the cyclic tetramer. The second fraction boiling between 230–240° C. had a refractive index of 1.4500 indicating the cycle pentamer. The yield of tetramer was 23.6 percent of theoretical based on starting materials and the total distillables were 33.3 percent. Volatiles plus non-volatiles represented 94 percent.

The following analytical and physical data were obtained for the compounds:

|  | Found | Theoretical |
|---|---|---|
| Cyclic Tetramer ($C_{28}H_{56}O_{12}Si_4$): | | |
| Carbon | 47.8 | 48.3 |
| Hydrogen | 7.8 | 8.04 |
| Silicon | 15.5 | 16.1 |
| Molecular weight | [1] 614 | 696 |
| Saponification No | 323 | 325 |
| Cyclic pentamer ($C_{35}H_{70}O_{15}Si_5$): | | |
| Carbon | 47.7 | 48.3 |
| Hydrogen | 8.2 | 8.04 |
| Silicon | 16.3 | 16.1 |
| Molecular weight | [1] 911 | 870 |
| Saponification No | 325 | 325 |

[1] Cryoscopic method.

Example VI.—Preparation of beta-carbethoxyethylpolysiloxane by neutral hydrolysis of beta-carbethoxyethyltriethoxysilane

CHART REACTION 4

Beta-carbethoxyethyltriethoxysilane, in amount 10 grams was mixed with 5 grams of water in a 125 cubic centimeter flask and agitated by shaking the contents. A temperature rise of 14° C. was observed and the initial two-phase system changed to a homogeneous one. After five (5) days at room temperature, the solution was first stripped of volatile material at 100° C. under 1 mm. Hg pressure, and finally at 160° C. A solid resinous product (5.1 grams or 88 percent of theoretical) was obtained. This product had a saponification number of 358 whereas the theoretical for the compound is 366.

PREPARATION OF CARBOALKOXYPOLYMETHYLENEALKYLCYCLOSILOXANE POLYMERS BY DIRECT ACID ALCOHOLYSIS OF CYANOPOLYMETHYLENEALKYLCYCLOSILOXANE POLYMERS

Example VII.—Preparation of gamma-carbethoxypropylmethylsiloxane cyclic tetramer by acid alcoholysis of gamma-cyanopropylmethylsiloxane cyclic tetramer

CHART REACTION 5

Gamma-cyanopropylmethylsiloxane cyclic tetramer, in amount 218 grams, was dissolved in 500 cubic centimeters of absolute ethanol within a two-liter, three-necked flask fitted with a thermometer, reflux condenser, stirrer and gas inlet tube. Hydrogen chloride was then bubbled into the solution with stirring until the solution was saturated. The solution was then heated to reflux for 76 hours with stirring during which time $NH_4Cl$ precipitated. The salt was then filtered off, and the solution again saturated with hydrogen chloride and refluxed for an additional eight (8) hours. The ethanol was then removed by a vacuum evaporation. The liquid residue was then distilled through a "Hickman" molecular still. A cut was isolated which distilled at 235–250° C. at 150 microns and had a refractive index of 1.4472.

An infrared survey of this fraction showed it to be essentially the gamma-carbethoxypropylmethylsiloxane cyclic tetramer, and the refractive index value confirmed this fact. The total yield of volatile cycles was 52.7 percent of the crude product.

Example VIII.—Preparation of gamma-carbethoxypropylmethylsiloxane cyclic trimer, gamma-carbethoxypropylmethylsiloxane cyclic tetramer, and gamma-carbethoxypropylmethylsiloxane cyclic pentamer by acid alcoholysis of gamma-cyanopropylmethylsiloxane cyclic tetramer

CHART REACTION 5

Gamma-cyanopropylmethylsiloxane cyclic tetramer, in amount 470 grams, was dissolved in absolute ethanol (552 grams) within a three-liter, three-necked flask fitted with a stirrer, gas inlet tube and reflux condenser. The solution was then stirred, saturated with hydrogen chloride and heated to reflux (80° C.) for 16 hours during which time ammonium chloride precipitated. The ammonium chloride was filtered off, and the filtrate was again saturated with hydrogen chloride and refluxed an additional eight (8) hours, at which point it was again filtered to remove any ammonium chloride. The alcohol was then removed by vacuum evaporation and the residue was washed with dilute sodium bicarbonate. The siloxane was then dissolved in ether and toluene and washed with distilled water until neutral to pH paper. The solvents were then removed by vacuum evaporation. Infrared analysis of the material showed it to be high in linear gamma-carbethoxypropylmethylpolysiloxane but free of C=$ONH_2$, C=NH and C≡N bonds. The following procedure was adopted to increase the yield of cyclics.

The gamma-carbethoxypropylmethylsiloxane linears, in amount 350 grams, were dissolved in 500 cubic centimeters of toluene within a two-liter flask fitted with a reflux condenser, and concentrated sulfuric acid (4.0 grams) was added. The solution was then refluxed for five (5) hours, thereafter cooled to room temperature, and the sulfuric acid neutralized with a dilute solution of sodium bicarbonate. The solution was then washed with distilled water until the water washings were neutral to pH paper. The solvent was then removed by vacuum evaporation and the residue was distilled in a "Hickman" molecular still to yield cuts of the cyclic trimer, tetramer and pentamer. The total yield of distillables was 88 percent of theoretical based on starting material.

Since the "Hickman" still was relatively small, the distillation was divided into parts. One such distillation gave trimer, tetramer and pentamer in the following amounts, the structures of which were confirmed by infrared analysis:

| | Percent |
|---|---|
| Trimer | 31.3 |
| Tetramer | 53.2 |
| Pentamer | 5.2 |
| Distillable | 89.7 |

The following refractive indices and boiling points were obtained for the materials and the analytic data for the tetramer and pentamer compared favorably with those given in Example V.

GAMMA-CARBETHOXYPROPYLMETHYLCYCLOPOLYSILOXANES

| | $n_D^{25°}$ C. | B.P., ° C. 50 microns Hg |
|---|---|---|
| Cyclic Trimer [1] | 1.4431–58 | 215 |
| Cyclic Tetramer | 1.4462–8 | 240–280 |
| Cyclic Pentamer | 1.4497 | 300–340 |

[1] Molecular weight: Found, 543; Calculated, 522.

In an analogous manner, the beta-carbethoxyethylmethylsiloxane cyclics can be prepared from the beta-cyanoethylmethylsiloxane cyclic tetramer. The following analytical and physical data were obtained for the pure tetramer:

$$[EtOOC(CH_2)_2SiMeO]_4$$

Boiling point: 205–210° C. (0.8 mm.)
Refractive index ($n_D^{25°}$ C.)—1.4376
Molecular weight: Cal. 640; Found 621
Saponification No.: Theoretical 350; Found 365
Si—($C_6H_{12}SiO_3$): Cal. 17.5%; Found 19.1%.

Both the trimer and pentamer were also identified by infrared analysis of a higher boiling point fraction obtained by distillation.

TRANSESTERIFICATION REACTIONS

Example IX.—Reaction of 2-ethylbutanol with gamma-carbethoxypropylmethyldiethoxysilane in a 1:1 molar ratio to produce gamma-carbo-2-ethylbutoxypropylmethyldiethoxysilane

CHART REACTION 6

Gamma - carbethoxypropylmethyldiethoxysilane (0.1 mol), 2-ethylbutanol (0.1 mol) and trifluoroacetic acid (1.0 gram) were mixed in a 100 cubic centimeter round-bottomed flask fitted with a reflux condenser, and heated therein. Ethanol began to reflux in the head almost immediately. The volatile material was taken off at the head and showed a refractive index very close to that of pure ethanol. After the ethanol was collected (5.75 cc.) the residue was then heated for one hour at 100° C. under vacuum (less than 1 mm.) to remove the remaining ethanol and any unreacted 2-ethylbutanol. The residue was then heated to 160° C. under vacuum to remove any unreacted gamma-carbethoxypropylmethyldiethoxysilane. The end-product was subjected to infrared analysis and found to contain both the ethoxy and carbo-2-ethylbutoxy groups.

Example X.—Transesterification of gamma-carbethoxypropylmethyldiethoxysilane with 2-ethyl-butanol in a 1:2 molar ratio to produce gamma-carbo-2-ethylbutoxypropylmethyldi-2-ethylbutoxysilane

CHART REACTION 6

Gamma - carbethoxypropylmethyldiethoxysilane (0.1 mol and 2-ethylbutanol (0.2 mol) were mixed in a 250 cubic centimeter round-bottomed flask fitted with a still head, and 1.0 gram of trifluoroacetic acid was added. The flask was then heated and refluxing started almost immediately. The volatiles were removed as formed. Fourteen (14) cubic centimeters of volatiles were collected ($n_D^{24°\,C.}$=1.3645). The residue was then stripped at 160° C. under vacuum to remove any unreacting starting silane. The residue thus obtained was subjected to infrared analysis and found to be substantially all gamma-carbo - 2 - ethylbutoxypropylmethyldi - 2 - ethylbutoxysilane.

Example XI.—Transesterification of gamma-carbethoxypropylmethyldiethoxysilane with n-butanol in a 1:2 molar ratio to produce a gammacarbobutoxypropylmethyldibutoxysilane

CHART REACTION 6

Gamma - carbethoxypropylmethyldiethoxysilane (0.1 mol) and n-butanol (0.2 mol) were charged into a 250 cubic centimeter round-bottomed flask fitted with a still head. Trifluoroacetic acid (1.0 gram) was added as catalyst, and the materials were thereafter heated to 100° C. for three days. Since a low yield had been obtained in a previous run it was thought that the trifluoroacetic acid might be too volatile, and, therefore, perfluoroglutaric acid (1.0 gram) was added and the heating continued for twenty-four more hours. The ethanol formed was distilled over at atmospheric pressure. On heating the pot to 300° C. at atmospheric pressure no further volatile material was isolated. The residue was then stripped under vacuum at 160° C. to remove unreacted starting material. Carbobutoxypropylmethyldibutoxysilane was identified by infrared analysis within the final residue.

Example XII.—Transesterification of gamma-carbethoxypropylmethyldiethoxysilane with n-butanol in a 1:3 molar ratio to produce gamma-carbobutoxypropylmethyldibutoxysilane

CHART REACTION 6

Gamma - carbethoxypropylmethyldiethoxysilane (0.1 mol) and n-butanol (0.3 mol) were mixed in a 250 cubic centimeter round-bottomed flask and trifluoroacetic acid (1.0 gram) was added thereto. The flask was then fitted with a water-cooled still head and heated to 100° C. for 72 hours. Perfluoroglutaric acid was then added and the mixture was heated to reflux for twenty-four hours during which time the ethanol was distilled off. The reaction solution was then stripped under vacuum (less than 1 mm.) at 100° C. to remove the remaining ethanol and unreacted n-butanol. The reaction solution was then stripped at 160° C. under vacuum to remove the unreacted starting silane. The residue thus obtained was shown to be gamma-carbobutoxypropylmethyldibutoxysilane by infrared analysis.

Example XIII.—Esterification of gamma-carboxypropylmethylsiloxane cyclic tetramer with "Ucon LB-40"

CHART REACTION 6

Gamma-carboxypropylmethylsiloxane cyclic tetramer, in amount 43.8 grams, "Ucon LB-40" (a Ucon of about 300 molecular weight containing a terminal OH group), in amount 108 grams (20% excess), 2.0 grams of trifluoroacetic acid, and 400 cubic centimeters of toluene were charged into a one-liter flask fitted with a Dean Stark Moisture Trap and refluxed at 120° C. for 24 hours. At the end of this time, the trifluoroacetic acid was neutralized and the material stripped under vacuum. The residue weighed 81 grams representing a 66 percent yield. The compound had a viscosity of 28 centistokes at 25° C.

UTILITY REACTIONS

The following additional examples are offered for purposes of illustrating other reactions and select uses of typical compounds of the invention.

Example XIV.—Preparation of amide of beta-carbethoxyethyltriethoxysilane

Beta-carbethoxyethyltriethoxysilane of Example I (0.2 mole) and p-aminobenzoic acid (0.2 mole) were heated in a flask fitted with a still head to 150° C. Ethanol began to reflux and the refluxing was continued for thirty-two (32) hours. The ethanol was then distilled off and the residue was vacuum stripped at 150–200° C. The resulting product was dissolved in chloroform, filtered and then stripped of chloroform to yield a viscous resin-like material. This material proved to be an excellent ultraviolet absorber in the 2600 to 3100 A. range. The percent transmission through a solution containing 0.041 gram per liter of the product in ethanol within a cell of one centimeter thickness is given below.

| Wavelength (A.): | Percent transmission |
|---|---|
| 2600 | 16.5 |
| 2700 | 7.0 |
| 2800 | 4.0 |
| 2900 | 4.0 |
| 3000 | 5.5 |
| 3100 | 14.5 |

Example XV.—Preparation of dimethylsilicone oil containing fifty percent by weight of gamma-carbethoxypropylmethylsiloxy units Octamethylcyclotetrasiloxane, in amount 84.6 grams, dodecamethylpentasiloxane, in amount 15.4 grams, and gamma-carbethoxypropylmethylsiloxane, in amount 100 grams, were mixed in a one-liter, round-bottomed, three-necked flask fitted with a stirrer and thermometer. The solution was heated to 80–90° C. on a steam bath and a 2 percent by weight concentrated sulfuric acid solution was added with stirring. The heating and stirring were continued for three (3) hours. The oil was then cooled to room temperature and sodium bicarbonate added to neutralize the sulfuric acid. The oil was then dissolved in diethyl ether and washed with distilled water until the water washings were neutral to pH paper. The ether was then evaporated off and 100 cubic centimeters of toluene added. The toluene and any water remaining were then stripped off under vacuum at 150° C. (three hours).

The resulting oil had a viscosity of 70.5 centistokes at 25° C.

Another oil containing five (5) percent by weight of gamma-carbethoxypropylmethylsiloxy units and having a viscosity of 79 centistokes at 25° C. was prepared from 5.0 grams of the gamma-carbethoxypropylmethylsiloxane cyclic tetramer of Example V, 87.3 grams of octamethylcyclotetrasiloxane and 7.7 grams of dodecamethylpentasiloxane.

Example XVI.—Preparation of a silicone-modified alkyd resin

This example describes the preparation of an ethoxy-endblocked silicone polymer consisting of $C_6H_5SiO_{3/2}$, $(C_6H_5)_2SiO$, $EtOOC(CH_2)_3SiO_{3/2}$ and $EtOOC(CH_2)_3SiCH_3O$ units, and the copolymerization of this silicone with an alkyd resin containing free OH groups by transesterification.

For convenience, the cyano rather than the carbethoxy containing siloxane was prepared first and the nitrile groups were then converted to carbethoxy by the alcoholysis technique of the invention.

The starting materials were:

| | Moles |
|---|---|
| Gamma-cyanopropyltrichlorosilane | 0.3 |
| Phenyltrichlorosilane | 0.3 |
| Gamma-cyanopropylmethyldichlorosilane | 0.2 |
| Diphenyldichlorosilane | 0.3 |
| Ethanol | 0.24 |
| Water | 1.175 |

The phenyltrichlorosilane and gamma-cyanopropyltrichlorosilane were charged to a one-liter, three-necked flask equipped with dropping funnel, stirrer, vacuum attachment and thermometer. The ethanol was added slowly with stirring and external cooling. The above difunctional monomers in 200 cubic centimeters of dry diethyl ether were then added followed by slow addition of the water. The contents were stirred for one hour. This completed the primary polymer-forming step. The next step was directed to alcoholysis of the nitrile groups and further condensation of the materials. Two hundred (200) cubic centimeters of dry ethanol were added and the ether stripped from the solution. The solution was then saturated with HCl and refluxed for six hours. A large quantity of ammonium chloride appeared as a precipitate during the reflux period. The solution was neutralized with sodium bicarbonate, filtered, diluted with 200 cubic centimeters of toluene, and finally stripped of both toluene and excess alcohol to yield a resinous product containing 90.8 percent solids. The product had a saponification number of 147 and contained 21.6 percent ($OC_2H_5$) as Si-OEt and COOEt units.

The above polymer was reacted with an alkyd resin prepared from the following materials:

| | | |
|---|---|---|
| 2-ethylhexoic acid | moles | 2.4 |
| Glycerine | do | 2.9 |
| Dimethyl tetephthalate | do | 2.24 |
| Litharge, catalyst | grams | 2 |

The alkyd had a saponification number of 447 and acid number of 7.2 and cotnained 5.1 percent OH groups.

The silicone resin (40 grams) and alkyd resin (360 grams), in Solvesso 150 solvent (360 grams), were heated in a distillation flask with stirring until gellation appeared imminent. Ethanol was formed and 4.5 grams collected, the theoretical for complete transesterification of carbethoxy groups being 8.8 grams. The resin was cooled and 40 grams of isophorone were added. This resin solution had a viscosity of 205 centipoises and contained 44.4 percent resin solids. It was used to coat glass cloth, aluminum and bonderized sheet steel. The dipped coatings cured to a hard flexible film at 200° C. which was not attacked by boiling water and only slightly by toluene. The heat stability of the films was excellent, in fact, much better than could have been expected for a product this low in silicone content. Glass cloth coated specimens were aged at 250° C. and showed good retention of their high initial dielectric strength after ten (10) days at this temperature. In one test, the initial dielectric strength was 1200 volts per mil and dropped to only 1160 volts per mil after 10 days at 250° C.

Example XVII.—Preparation of the sodium salt and free acid of beta-carboxyethylpolysiloxane by saponification and neutralization from beta-carbethoxyethyltriethoxysilane Beta-carbethoxyethyltriethoxysilane, in amount 50 grams, was placed within a 500 cubic centimeter round-bottomed flask fitted with a reflux condenser, and 10.5 grams of sodium hydroxide dissolved in 250 cubic centimeters of water was added thereto. The mixture was then refluxed for 72 hours. The ethanol was stripped off and the residue was dissolved in water. The material was then filtered to remove solid particles. The water solution was acidified with a ten percent hydrochloric acid solution to give the free acid. A gel was formed. A gel was filtered off and washed with water. The gel was then dried in a vacuum oven at 100° C. to yield a white solid which was identified as the desired free acid derivative.

Example XVIII.—Preparation of a carbethoxy-modified silicone resin by cohydrolysis of gamma-carbethoxypropyltriethoxysilane, phenyltriethoxysilane and diphenyldiethoxysilane The following ethoxy silanes, in the amounts indicated, were dissolved in 100 milliliters of EtOH and charged into a one-liter, three-necked flask fitted with stirrer, thermometer, and dropping funnel:

$EtOOC(CH_2)_3Si(OEt)_3$—79.2 grams (0.3 mole)
$\phi Si(OEt)_3$—85.5 grams (0.3 mole)
$\phi_2 Si(OEt)_2$—110.4 grams (0.4 mole)

Water was added to the mixture dropwise from the funnel, in amount 27.0 grams (10% excess—1.5 moles), and the temperature rose from 18° C. to 21° C. Following the addition, heat was applied and a water condenser was put in place of the dropping funnel. The solution was refluxed for four (4) hours (80° C.). A clear light green solution was obtained upon cooling. A sample was taken of this carbethoxy-modified resin, stripped of solvent, and heated at 150° C. for 2 hours to yield a resin consisting of 99.8% solids. No gel formation occurred. ($n_D^{25°\,C.}=1.5353$). An infrared spectrum showed residual Si—OH, CH(phenyl), $CH_3CH_2$—, $COOC_2H_5$, Si$\phi$, Si$\phi_2$ and Si—O—Si.

Example XIX.—Preparation of beta-carbethoxyethylmethylsiloxane cyclic polymers by hydrolysis of beta-carbethoxyethylmethyldiethoxysilane Seventy grams (0.3 mole) of beta-carbethoxyethylmethyldiethoxysilane, 300 milliliters of diethyl ether and 25 milliliters of water were charged into a one-liter distillation flask fitted with a reflux condenser and magnetic stirrer. The mixture was stirred at room temperature for 90 hours. Water and ether were removed under reduced pressure to yield 49 grams (100% yield) of a clear water-white liquid. The hydrolyzate was charged to a "Hickman" molecular still and distilled under reduced pressure to yield the following three fractions:

(I) boiling point 70–80° C. (1.0–5.0) $n_D^{25°\,C.}$ 1.4379 (yield 13 grams);
(II) boiling point 90–110° C. (2.0–5.0) $n_D^{25°\,C.}$ 1.4438 (yield 8.0 grams);
(III) boiling point 110–220° C. (2.0–5.0) $n_D^{25°\,C.}$ 1.4434 (yield 7.2 grams).

Fraction I was found upon analysis to be a mixture of cyclic trimer and tetramer, containing mostly trimer but also some residual Si—OH. The analytical data for this fraction are as follows:

Calculated: C, 45.0; H, 7.5; Si, 17.5; OEt, 28.1. ($C_6H_{12}SiO_3$): C, 41.3; H, 7.9; Si, 18.7; OEt, 25.2.

Fractions II and III were found to be largely cyclic tetramer, containing some trimer and residual Si—OH.

Having thus described the subject matter of our invention, what it is desired to secure by Letters Patent is:

1. Process for the production of an organo functional silicon compound that comprises, admixing a cyanoalkyl compound selected from the class consisting of compounds represented by the formulae:

(A)

and (B)
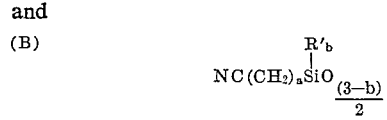

wherein R′ is a member selected from the group consisting of monovalent hydrocarbon radicals; X is a member selected from the group consisting of halogen and alkoxy; $a$ is an integer greater than one; and $b$ in Formula A has a value from 0 to 3 inclusive, and in Formula B a value from 0 to 2 inclusive; with an aliphatic alcohol and causing the cyanoalkyl compound and alcohol to react under conditions such as to effect, initially, esterification of any halogen present in the cyanoalkyl starting material with elimination of hydrohalic acid and, ultimately, alcoholysis of the cyanoalkyl compound in the presence of a strong mineral acid to convert the cyano group thereof to a carboalkyl group; and separating and recovering the resulting carboalkoxyalkyl-substituted silicon compound from the alcoholic reaction medium.

2. Process for the production of an organo functional silane selected from the group consisting of silanes represented by the formula:

(A)

wherein R and R′ are members selected from the group constisting of monovalent hydrocarbon radicals; X is a member selected from the group consisting of alkoxy radicals; $a$ is any integer greater than one; and $b$ has a value from 0 to 3 inclusive; that comprises, admixing a cyanoalkyl silane selected from the group consisting of silanes represented by the formula:

(B)

wherein R′ is a member selected from the group consisting of monovalent hydrocarbon radicals; Y is a member selected from the group consisting of halogen and alkoxy substituents; $a$ is any number greater than one; and $b$ has a value from 0 to 3 inclusive; with an aliphatic alcohol, and causing the cyanoalkyl compound and alchohol to react under conditions such as to effect, initially, esterification of any halogen present in the cyanoalkyl silane starting material with elimination of hydrohalic acid and, ultimately, alcoholysis of the cyanoalkyl silane in the presence of a strong mineral acid to convert the cyano group thereof to a carboalkoxy group; and separating and recovering the resulting carboalkoxyalkyl-substituted silane from the alcoholic reaction medium.

3. Process for the production of a beta-carboalkoxy-ethyltrialkoxysilane that comprises, admixing a beta-cyano-ethyltrialkoxysilane that comprises, admixing a beta-cyano-ethyltrialkoxysilane with an aliphatic alcohol and causing the silane and alcohol to react in the presence of a strong mineral acid to convert the cyano group of the silane to a carboalkoxy group with the production of a beta-carboalkoxy-ethyltrialkoxysilane.

4. Process for the production of a gamma-carboalkoxy-propyltrialkoxysilane that comprises, admixing gamma-cyano-propyltrichlorosilane with an aliphatic alcohol and causing the silane and alcohol to react for the production of a gamma-cyanopropyltrialkoxysilane, and reacting this product by alcoholysis in the presence of additional alcohol and a strong mineral acid to convert the cyano group thereof to a carboalkoxy group with the production of a gamma-carboalkoxypropyltrialkoxysilane.

5. Process for the production of a gamma-carboalkoxy-propylalkyldialkoxysilane that comprises, admixing a gamma-cyanopropylalkyldichlorosilane with an aliphatic alcohol and causing the silane and alcohol to react for the production of a gamma-cyanopropylalkyldialkoxysilane, and reacting this product by alcoholysis in the presence of additional alcohol and a strong mineral acid to convert the cyano group thereof to a carboalkoxy group with the production of a gamma-carboalkoxypropylalkyldialkoxysilane.

6. Process for the production of a carboalkoxypoly-methylenealkoxysilane that comprises, admixing a cyano-polymethylenechlorosilane with an aliphatic alcohol and causing the silane and alcohol to react for the production of a cyanopolymethylenealkoxysilane, and reacting the cyanopolymethylenealkoxysilane by alcoholysis in the presence of additional alcohol and a strong mineral acid to convert the cyano group thereof to a carboalkoxy group with the production of a carboalkoxypolymethylenealkoxysilane.

7. Process for the production of beta-carbethoxy-ethyltriethoxysilane that comprises, admixing beta-cyanoethyltrichlorosilane with ethanol and causing the silane and ethanol to react with elimination of hydrogen chloride and the production of beta-cyanoethyltriethoxysilane, admixing the beta-cyanoethyltriethoxysilane with an additional quantity of ethanol in a molar excess over that required for alcoholysis of the cyano group thereof and causing the beta-cyanoethyltriethoxysilane and ethanol to react by heating the reaction mixture while maintaining it substantially saturated with hydrogen chloride thereby converting the cyano group of the beta-cyanoethyltriethoxysilane to a carbethoxy group, and separating and recovering beta-carbethoxyethyltriethoxysilane from the reaction mixture.

8. A beta-carboalkoxyethylalkylsiloxane cyclic trimer.

9. A beta-carboalkoxyethylalkylsiloxane cyclic tetramer.

10. A beta-carboalkoxyethylalkylsiloxane cyclic pentamer.

11. The process for making carbalkoxyalkyl polysiloxanes which comprises (1) heating at a temperature above 50° C. a mixture of (a) a cyanoalkylchlorosilane having the formula:

$$(NCC_xH_{2x})_{(4-m-n)}-\underset{\underset{R'_m}{|}}{Si}-Cl_n$$

where R′ is a lower alkyl radical of less than 4 carbon atoms, $m$ is a whole number equal to from 0 to 1, inclusive, and $n$ is a whole number equal to from 2 to 3, inclusive, the total of $m+n$ being equal to at most 3, and $x$ is an integer equal to from 2 to 8, and (b) ethanol, there being employed at least 1 mol of ethanol per cyano group of the cyanoalkylchlorosilane, and at least 1 additional mol of ethanol for each silicon-bonded chlorine atom in the hydrolyzable cyanoalkylchlorosilane, and (2) hydrolyzing the carbalkoxyalkyl polysiloxane, there being employed at least one mol of water per silicon-bonded chlorine atom in the hydrolyzable cyanoalkyl chlorosilane.

References Cited

UNITED STATES PATENTS

| | | | |
|---|---|---|---|
| 2,469,888 | 5/1949 | Patnode | 260—448.2 |
| 2,486,162 | 10/1949 | Hyde | 260—448.2 |
| 2,589,446 | 3/1952 | Sommer. | |
| 2,610,199 | 9/1952 | Sommer. | |
| 2,687,418 | 8/1954 | Sommer. | |
| 2,687,424 | 8/1954 | Sommer. | |
| 2,691,032 | 10/1954 | Sommer. | |
| 2,721,856 | 10/1955 | Sommer. | |
| 2,723,987 | 11/1955 | Speier. | |
| 2,776,306 | 1/1957 | Cole. | |
| 3,143,524 | 8/1964 | Cooper et al. | 260—46.5 |
| 2,673,843 | 3/1954 | Humphrey et al. | 260—448.2 |
| 2,763,675 | 9/1956 | Prochaska. | |
| 2,819,245 | 1/1958 | Shorr. | |
| 2,823,218 | 2/1958 | Speier et al. | |
| 1,116,726 | 2/1956 | Cooper et al. | |
| 3,143,524 | 8/1964 | Cooper et al. | 260—46.5 |

OTHER REFERENCES

Calas et al., "Oleagineux," vol. 8 (1953), pp. 21–23 (47 Chem. Abstr. 12,223).

Fieser et al., "Organic Chemistry" (1944), Heath and Co., Boston, publ., pp. 170, 308, 682.

Petrov et al., "Doklady Akad. Nauk," SSSR, vol. 100 (1955), pp. 711–714.

Wagner et al., "Synthetic Organic Chem.," John Wiley and Sons, Inc., New York, publisher (1953), pp. 485–7.

HAROLD D. ANDERSON, Primary Examiner

U.S. Cl. X.R.

117—161; 260—18, 448.2, 448.8